US011037169B1

(12) United States Patent
Bhatt et al.

(10) Patent No.: US 11,037,169 B1
(45) Date of Patent: Jun. 15, 2021

(54) MOBILE WALLET FOR DEVICE SUPPORT OPERATIONS

(71) Applicant: Wells Fargo Bank, N.A., San Francisco, CA (US)

(72) Inventors: Sudheendranath R. Bhatt, Bangalore (IN); Rameshchandra Bhaskar Ketharaju, Hyderabad (IN); Suresh Reddy, Hyderabad (IN); Anupam Upadhyay, Hyderabad (IN); Anil Kumar R. Gutha, Ranga Reddy (IN); Satya Prakash, Hyderabad (IN); Srikanth Bobbasani, Hyderabad (IN); Chloe D. Cangardel, Boston, MA (US); Suresh Chinthanagandla, Ranga Reddy (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 617 days.

(21) Appl. No.: 15/848,775

(22) Filed: Dec. 20, 2017

(51) Int. Cl.
*G06Q 40/06* (2012.01)
*G06Q 30/00* (2012.01)
*H04L 12/28* (2006.01)
*H04W 4/35* (2018.01)
*G06K 7/10* (2006.01)
*G06Q 20/36* (2012.01)

(52) U.S. Cl.
CPC ............ *G06Q 30/016* (2013.01); *G06K 7/10* (2013.01); *G06Q 20/363* (2013.01); *G06Q 30/012* (2013.01); *H04L 12/281* (2013.01); *H04L 12/2834* (2013.01); *H04W 4/35* (2018.02)

(58) Field of Classification Search
CPC .... G06Q 40/00; G06Q 20/363; G06Q 30/012; G06K 7/10; H04W 4/35; H04L 12/281; H04L 12/2834
See application file for complete search history.

(56) References Cited

U.S. PATENT DOCUMENTS

2016/0071094 A1* 3/2016 Krishnaiah .......... G06Q 20/308
705/66

OTHER PUBLICATIONS

Frank Macindoe et al., E-Cash—Making Money From Websites, Television Education Network Pty Ltd., Feb. 1998, web, 1-8 (Year: 1998).*

* cited by examiner

*Primary Examiner* — I Jung Liu
(74) *Attorney, Agent, or Firm* — Walter Haverfield LLP; James J. Pingor (57) ABSTRACT

A method, system and computer program product automate support for an Internet of Things (IoT) device by a trusted agent. The system includes a mobile wallet executed by a user device that effects execution of a financial transaction with a third party system for an IoT device. A device interface receives a unique identifier associated with the IoT device. A network interface accesses support information associated with the unique identifier of the IoT device. A secure storage used by the mobile wallet stores the unique identifier and support information. A support operation engine executes a support operation for the IoT device based on the unique identifier and support information in the secure storage accessed by the mobile wallet.

5 Claims, 7 Drawing Sheets

MOBILE WALLET FOR DEVICE SUPPORT OPERATIONS

BACKGROUND

The present application relates to information handling systems, and more particularly to an information handling system that including a network router that provides connectivity to Internet of Things (IoT) appliances and devices.

More and more types of appliances and devices are connectable to a network, increasing possibilities for interactive functions. The ubiquitous nature of IoT devices also enables or requires a similar increase in lifecycle support through monitoring, diagnostics and repair services. With each increase in the types and complexity of such IoT appliances and devices that are available, so too is there a corresponding increase in the workload in setting up and supporting such devices during their lifecycle.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems are provided herein for recognizing that a trusted agent of a user is needed that can automatically introduce a newly acquired Internet of Things (IoT) appliance or device into a home or business network. Ideally, the trusted agent is able to acquire all or most of the required information automatically at a Point of Sale (POS) or online purchasing venue of the IoT appliance or device, or from the IOT appliance or device itself. The information can come from another entity in a supply chain for the IoT appliance or device, such as an Original Equipment Manufacturer (OEM). A mobile or digital wallet executed by a user device can act as the trusted agent since the mobile wallet is utilized at a POS or online purchasing venue to accomplish a transaction for the IoT appliance or device. In addition, the user device is generally carried by a user into proximity with a network in which the IoT appliance or device is to be connected and used.

In one or more embodiments, the present disclosure provides a method of automating support for an IoT device by a trusted agent. The method effecting, by a mobile wallet executed on a user device, a financial transaction with a third party system for an IoT device. The method includes receiving a unique identifier associated with the IoT device. The method includes accessing support information associated with the unique identifier of the IoT device. The method includes storing the unique identifier and support information in the mobile wallet. The method includes executing, by the user device, a support operation for the IoT device based on the unique identifier and support information in the mobile wallet.

In one or more embodiments, the present disclosure provides a system that automates support for an IoT device by a trusted agent. The system includes a mobile wallet executed by a user device that effects execution of a financial transaction with a third party system for an IoT device. A device interface receives a unique identifier associated with the IoT device. A network interface accesses, via a network, support information associated with the unique identifier of the IoT device. A secure storage used by the mobile wallet stores the unique identifier and support information. A support operation engine executes a support operation for the IoT device based on the unique identifier and support information in the secure storage accessed by the mobile wallet.

In one or more embodiments, the present disclosure provides a computer-readable storage medium including computer-executable instructions. When executed via a processing unit on a computer performs acts, the instructions cause processing unit to perform the above-described method.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

The present disclosures provides for a digital or mobile wallet that acts as a trusted agent for facilitating non-payment applications that are associated with financial services. In one or more embodiments, the present disclosures provides for such a mobile wallet that can automate register and provide support for Internet of Things (IoT) devices or appliances. Various products are sold at a point of sale (POS) location or through online marketplaces that require registration a provider within the supply chain or require registration with a local Wi-Fi network for operation. At the same time, the use of mobile wallets continues to increase and the mobile wallets are connected to the Wi-Fi gateways/routers of the user. The present disclosure is applicable to systems and methods that allow a mobile wallet device to automatically register an IoT device with a Wi-Fi router to automatically use the IoT device. Additionally the mobile wallet may also provide robust warranty administration.

Manufacturers, dealers, or thirty-party users, require a robust warranty administration program for critical aspects of the warranty process, which entails monitoring of policies, flat rates, fault codes, rules management, registration, and claims processing. The present innovation provides a solution to many warranty process-related problems—from contract/claims administration to reporting. The warranty administration system ensures consistent delivery and built-in features for advanced functionality and reporting. Warranty management is today a separate function of service parts management stream in an organization. Service parts managers are heads of their department and the entire business unit functions as a profit center with its revenue and cost budget. Service parts management teams and structure are the service support delivery owners and function as primary contact points with the customer. At the first level service, support teams comprise a customer service desk, which is the first point contact for the customers to register the service request. The proposed solution relates to a method and a system for an efficient and economical, warranty and service management in mobile wallet.

A customer purchases an IoT appliance or a product from a manufacturing warehouse. In an exemplary embodiment, the following information is gathered: (a) complete product information; (b) expiration date of warranty; (c) validity and limits of warranty at the time of purchase; (d) warranty extension or supplemental insurance coverage if applicable; (e) customer contact details; (f) unique item identifier via a machine readable code (e.g., one dimensional barcode, two-dimensional barcode such as quick response (QR) code, etc.) All of the related warranty information can be accessed from a stored through an application programming interface (API) of a smart IoT device.

In one or more embodiments, the smart IoT device can trigger the enhanced mobile wallet via a user device to automatically schedule service appointments based on the stored information for individual products. Alternatively or in addition, a provider or supporter of such IoT devices and systems that integrate such IoT devices can contact customers to inform them about their upcoming service appointments via the user device with the enhanced mobile wallet.

In one particular example of vehicle parts, a manufacturer warehouse can track and monitor an inventory of required parts as part of a warranty management engine and as part of a service scheduling engine. For example, a manufacturer's system can determine servicing timelines for a purchased product such as an IoT device and automatically schedule servicing appointments at a customer's convenience. Alternatively, this information is forwarded to the mobile wallet during purchase to enable the mobile wallet to manage such future requirements. Either the manufacturer or the user mobile wallet can participate in managing any applicable warranties and inventory of the product purchased. The system is capable of applying extended warranty to individual customers based on their purchase history.

The manufacturer can aggregate information received from IoT devices and push notifications to the user via a client warranty management engine executed by a user device having an enhanced mobile wallet. Alternatively, the client warranty management engine on the user device can detect the need for replacement or service of an IoT device and pull the required inventory or scheduling support from the manufacturer. Thereby, the manufacturer or other entity in the supply chain can manage or facilitate an improved lifecycle support process for subassemblies and assemblies of IoT devices. High availability of systems that depend on such IoT devices realized through such support can provide a good customer experience.

In another application, the POS device when interacting with the mobile wallet can send the unique item identifier such as a medium access control (MAC) address for the IoT device or appliance that is has just been purchased to the mobile wallet device. When the user logs into their home Wi-Fi router, the mobile wallet provides the MAC address for the purchased device to the Wi-Fi router. Similarly, when the mobile wallet returns the purchased IOT device to the merchant, the mobile wallet informs the Wi-Fi router to remove the earlier registered MAC address from the router.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure. As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Figure 1:
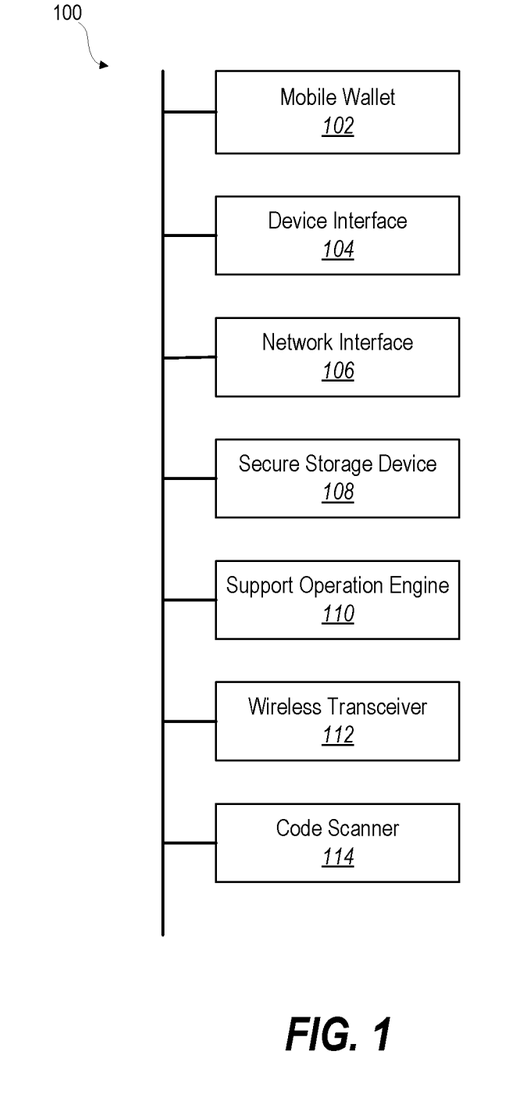
FIG. 1 illustrates a block diagram of a system for that automates support for an Internet of Things (IoT) device by a trusted agent, according to one or more embodiments.

FIG. 1 illustrates a system 100 according to aspects of the present innovation. The system 100 automates support for an IoT device by a trusted agent. In one or more embodiments, the system 100 includes a digital or mobile wallet 102 executed by a user device that effects execution of a financial transaction with a third party system for an IoT device. A device interface 104 receives a unique identifier associated with the IoT device. For example, the device interface can be a near field transceiver that communicates with a POS system. Alternatively, the device interface can be an integral or peripheral scanner that reads a unique item identifier on the IoT device or its associated packaging. A network interface 106 accesses support information via a network associated with the unique identifier of the IoT device. A secure storage device 108 that is used by the mobile wallet 102 stores the unique identifier and support information. The storage can be local, physical storage or virtual interface to remote storage. A support operation engine 110 executes a support operation for the IoT device based on the unique identifier and support information in the secure storage device 108 accessed by the mobile wallet 102. For example, the support operation engine 110 can act as a warranty management engine or a repair and service scheduling engine.

In one or more embodiments, the support operation engine 110 executes the support operation by registering via the network a selected one of: (i) a warranty agreement; and (ii) an insurance agreement offered by a guarantor to a purchaser of the IoT device. The support operation engine 110 uses user information, the unique identifier, and the support information in the mobile wallet.

In one or more embodiments, the support operation engine 110 determines occurrence of a trigger event that indicates applicability of a restitution obligation by the guarantor of the IoT device. The restitution obligation is according to terms of the selected one of: (i) the warranty agreement; and (ii) the insurance agreement. In response thereto, the support operation engine 110 requests, via the network interface 106, restitution by communicating to the guarantor one or more of: (a) user information; (b) the unique identifier, and (c) the support information in secure storage via the mobile wallet 102.

In one or more embodiments, the network interface 106 receives an alert from one of: (i) a manufacturer of the IoT device that receives diagnostic information originating on the IoT device; (ii) a system connected to the IoT device; and (iii) the IoT device. The support operation engine 110 generates a user alert on a user interface device of a user device to take a corrective action for to the IoT device.

In one or more embodiments, the support operation engine 110 registers a warranty agreement and facilitates execution of an overlapping or successor insurance agreement offered by a guarantor to a purchaser of the IoT device by using user information, the unique identifier, and the support information in the mobile wallet.

In one or more embodiments, the system 100 further includes a communication module such as a wireless transceiver 112 of the user device communicates via a selected one of: (i) a point of sale (POS) system; and (ii) a network node to effect the financial transaction with the third party. The system 100 includes a code scanner 114 is in communication with the device interface 104 and scans the unique identifier attached to the IoT device. The unique identifier is a selected one of: (i) a radio frequency identifier (RFID) tag; (ii) a one-dimensional barcode; and (iii) a two-dimensional barcode. The mobile wallet 102 requests the support information from a remote data structure via the network interface 106 and the wireless transceiver 112.

In one or more embodiments, the support operate engine 110 executes the support operation by automatically connecting the IoT device to a network router via the network interface using the unique identifier that comprises a medium access control (MAC) address.

Figure 2:
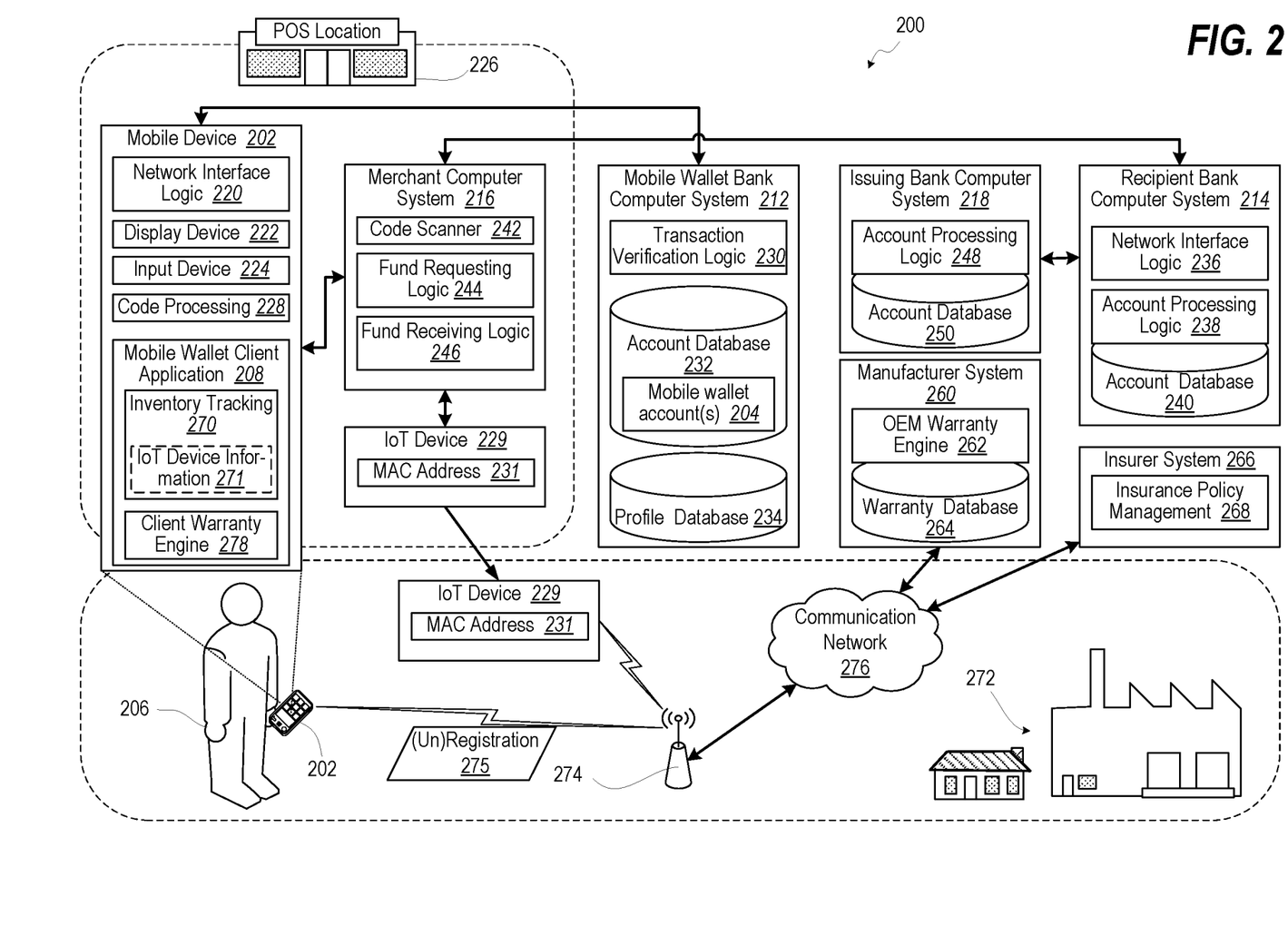
FIG. 2 illustrates a block diagram of an environment for automating support for an IoT device by a trusted agent at a point of sale (POS) and at a home or business network, according to one or more embodiments.

FIG. 2 illustrates a computer-implemented payment processing system 200 with purchased device support features such as warranty management. The payment processing system 200 may be used to set up and utilize a mobile wallet account 204 via a mobile user device 202. A user 206 may be a business entity and/or an individual consumer that has one or more source accounts with a financial institution. The source accounts may include business or consumer demand deposit accounts. The mobile wallet account 204 can be created for the user 206 to transmit funds from a demand deposit account in return for purchase of goods or services to a merchant. Additionally, funds can be transferred from the demand deposit account to another person.

An interoperable mobile wallet platform is provided that may be accessed by consumers that bank at various different banking institutions and by merchants that bank at various different banking institutions. Hence, a mobile wallet client application 208 (or various branded variations thereof such as e-wallet, digital wallet, etc.) may be offered through multiple banks and may utilize the services of multiple banks to complete transactions. Such an arrangement may promote broader adoption of the mobile banking platform by merchants and consumers.

Specifically, as shown in FIG. 2, a payment processing system 210 may include various computer systems such as a mobile user device 202, mobile wallet bank computer system 212, recipient bank computer system 214, merchant computer system 216, and issuing bank computer system 218. As will be appreciated, in practice, the computer system of a given banking institution may operate as the mobile wallet bank computer system in the context of some transactions and may operate as the recipient bank computer system in the context of other transactions.

In FIG. 2, the computer systems: (i) mobile user device 202, (ii) mobile wallet bank computer system 212; (iii) recipient bank computer system 214; (iv) merchant computer system 216; and (v) issuing bank computer system 218 may communicate with each other to complete transactions. Interconnections of the computer systems: (i) mobile user device 202, (ii) mobile wallet bank computer system 212; (iii) recipient bank computer system 214; (iv) merchant computer system 216; and (v) issuing bank computer system 218 will now be briefly described. The mobile user device 202 may be used by an individual user (e.g., a business owner or employee, a consumer, and so on) to create and interact with a mobile wallet account 204. The mobile user device 202 may, for example be, a handheld computer, a cellular phone, smart phone, mobile handheld wireless e-mail device, personal digital assistant, portable gaming devices, or other suitable device. The mobile user device 202 comprises a network interface logic 220, a display device 222, an input device 224, and a mobile wallet client application 208. Network interface logic 220 may include, for example, program logic that connects the mobile user device 202 to a network. For example, the mobile user device 202 may receive and display screens including account information, transaction instructions, and so on. In an example embodiment, such screens may be used to request username and password information. Such screens may also be used to prompt the user to provide information regarding the amount of the payment and which merchant or individual (e.g., name, address, phone number or e-mail, a selection of a recipient by the user from his memory or from by the user from the mobile user device 202, and so on) is to receive the payment. Such screens are presented to the user via the display device 222. The input device 224 may be used to permit the user to initiate account access and to facilitate receiving requested information from the user. As will be appreciated, in addition to or instead of the mobile user device 202, users may also be provided with the ability to access the payment processing system 210 using another type of computer (e.g., a desktop or laptop computer executing browser software) to perform the operations described herein as being performed by the mobile user device 202.

The mobile wallet client application 208 may comprise program logic executable by the mobile user device 202 to implement at least some or all of the functions described herein. As will be appreciated, the level of functionality that resides on the mobile user device 202 as opposed to the banking computer system 214 may vary depending on the implementation. The client application 208 may be a web browser that is configured to receive and display mobile web pages (e.g. web pages prompting the user to provide information to create an account, web pages displaying account balance information and past transactions, and so on). The mobile wallet client application 208 may also include a code/token generator capable of generating a unique code/token for each transaction. As described below, the unique code/token may then be transmitted by the mobile user device 202 as part of a transaction to facilitate authentication of the transaction. As will be appreciated, the user 206 may also use other devices (e.g., laptop or desktop computer system, not shown) to create and access account.

In FIG. 2, the mobile wallet client application 208 is used in connection with merchant computer system 216 located at a bricks and mortar POS store location 226. As previously indicated, however, the mobile wallet client application 208 may also be used in connection with online merchant transactions. For example, in another embodiment, merchants may be provided with the ability to have a mobile storefront and profile within the mobile wallet client application 208. For example, merchants may be provided with the ability to display marketing material, provide information, and promote products or discounts. Merchants may also be provided with the ability to sell items directly through their mobile storefront for the account holder to purchase from within the mobile application 208.

The mobile user device 202 may include, in addition to the other features previously described, a code processing system 228. The code processing system 228 may include a code scanner (i.e. camera), and/or a code generator. The mobile user device 202 can thereby directly access identify a unique item identifier such as a unique medium access control (MAC) address 229 for an IoT device 231 that is being purchased, in addition to generic product type information related to a stock keeping unit (SKU) code.

The bank computer system 212 includes transaction verification logic 230, account database 232, and profile database 234. The bank computer system 212 may receive a request from an account holder to initiate a transaction. The transaction verification logic 230 may receive a transaction amount from the merchant computer system 216. The transaction verification logic 230 may generate a message to send to the mobile user device 202 for verifying the transaction amount. Upon receiving the verification message, the account holder via mobile user device 202 may approve the transaction amount to the bank computer system 212. The account database 232 may store details regarding financial institution accounts. In particular, the account database 232 may store each financial transaction that occurred. Each financial transaction may include the amount of the transaction and the merchant.

The profile database 234 may store other information regarding the account holder. For example, the profile database 234 may store information useful for generating offers and advertisements that are selected specifically for the account holder. In some embodiments, the messaging hub computer system #20 may also be operative to process the transaction between the two parties. The mobile wallet bank computer system 212 can be configured to communicate with the mobile user device 202. The content of the communication may include account information regarding the user 206, confirmation of the code and approval/declining a transaction between the user 206 of the mobile user device 202 and a merchant, such as POS location 226.

In the example shown in FIG. 2, funds may be transferred from an account held by the user 206 of the mobile user device 202 to an account held by a merchant with a merchant computer system 216. The mobile user device 202 includes a processor and a non-transitory memory that are configured to receive and transmit information between one or more financial institutions. The information received from a sending financial institution may identify the recipient financial institution. The interface between the mobile user device 202 and the financial institutions uses bank level security encryption to send and receive messages.

The recipient bank computer system 214 includes network interface logic 236, account processing logic 238, and accounts database 240. When the mobile wallet account 204 is created, the user is prompted to provide bank account information (e.g., routing number and/or account number) for the source account that is used as a source of funds for the mobile wallet account 204. Thus, the financial institution that provides the mobile wallet account 204 for the user and the financial institution that typically provides banking services to the user may be two different financial institutions.

The merchant computer system 216 may be configured in generally the same manner as the other computer systems described herein. For example, if the fund recipient is an individual, the merchant computer system 216 may be another mobile device, such as a handheld computer, cellular phone, smart phone, mobile handheld wireless e-mail device, personal digital assistant, portable gaming devices, or other suitable device. If the fund recipient is a merchant (e.g., a brick and mortar merchant, a retail website or other online merchant, etc.), the merchant computer system 216 may comprise a point of sale (POS) device or other computer system (e.g., one or more servers each with one or more processors) configured to execute instructions, send and receive data stored in memory, and perform other operations to implement the operations described herein associated with the fund recipient.

The merchant computer system 216 may be used at a point of sale to conduct transaction with the account holder. For example, the merchant computer system 216 may comprise a code scanner 242 or other point of sale computer system such as a cash register system connected to a central server system operated by the merchant. As another example, the merchant computer system 216 may comprise a mobile computing device (e.g., smart phone, tablet PC, etc.) operated by a store clerk as the clerk moves throughout the store. Again, the mobile user device 202 in such an embodiment may connect to a central server system operated by the merchant.

The merchant computer system 216 includes fund requesting logic 244, and fund receiving logic 246. The fund requesting logic 244 communicates a fund request to the recipient bank computer system 214. In one embodiment, the fund requesting logic 244 also sends the amount of transaction to the financial transaction. The merchant computer system 216 may further connect to or integrate with other hardware. For example, in one embodiment, the merchant computer system 216 may connect to a card reader for reading credit cards, debit cards, stored value cards, and so on. As another example, the merchant computer system 216 may be configured to prompt the user to provide a random security code. The random security code may be generated by the mobile user device 202, by a separate security dongle, or in another manner. The security code may be provided to the merchant computer system 216 directly by the mobile device, may be keyed into the merchant computer system 216 (e.g., by a store clerk), or may be received in another manner. The recipient bank computer system 214 may then return account information (e.g., a credit card number, debit card number, alternative payment type, demand deposit account, etc.) to backend servers associated with the merchant computer system 216 to permit the transaction to be processed in the same manner as a conventional credit card or debit card transaction. Other mechanisms for processing payments may also be used.

As shown in FIG. 2, the recipient bank computer system 214 is configured to communicate with the merchant computer system 216. The recipient bank computer system 214 is configured to receive funds to the financial institution of the user (e.g. mobile wallet bank computer system 212). In other implementations, the recipient bank computer system 214 may be configured to communicate with the mobile user device 202 and/or the mobile wallet bank computer system 212.

As shown in FIG. 2, the merchant computer system 216 is configured to communicate with the recipient bank computer system 214 and the mobile user device 202. The merchant computer system 216 is configured to receive information from the recipient bank computer system 214. In other implementations, the merchant computer system 216 may be configured to communicate with the mobile user device 202 and/or the mobile wallet bank computer system 212. The interface between the merchant computer system 216 and the recipient bank computer system 214 uses bank level security encryption to send and receive messages.

As shown in FIG. 2, the issuing bank computer system 218 is operative to transfer funds from the demand deposit account held by the user 206 to the recipient bank computer system 214 under the direction of the recipient bank compute system 214. The issuing bank computer system 218 may be configured to communicate via a network ## with the mobile wallet bank computer system 212 and the recipient bank computer system 214. The issuing bank computer system 218 is configured to receive funds from various mobile wallet bank computer systems 212 and transmit the funds to the appropriate recipient bank computer system 214. The issuing bank computer system 218 may include an account processing logic 248 that determines which user has a credit card account and an account database that store information regarding user accounts in an account database 250. In other embodiments, the issuing bank computer system 218 is configured to be a registry information provider. The registry information may include an identifier for the user mobile wallet account 204.

The mobile wallet client application 208 is a trusted agent to the user 208 and the other entities described above. This trust can be extended to entities that provide support for the purchased IoT device 229, such as a manufacturer system 260 that has an original equipment manufacturer (OEM) warranty engine 262 and a warranty database 264. The trust can be extended also to an insurer system 266 having an insurance policy management engine 268 that provides supplemental insurance to the warranty or an extended warranty policy to succeed an expired manufacturer warranty.

The mobile wallet client application 208 can include or be affiliated with an inventory tracking system 270 for IoT device information 271 a pool of identical IoT devices 229 or unique types of IoT devices 229, tracking any individualized protection that are available or secured and usage in a home or business location 272. IoT devices 229 that are currently being used communicate via a router 274 or similar device to a communication network 276. The mobile wallet client application 208 can utilize the MAC address 231 to send automatic register or unregister commands 275 for a particular IoT device 229 to the router 274. The mobile wallet client application 208 can utilize a client warranty engine 278 to perform a support operation such as to register, maintain, and trigger obligations under a warranty or insurance policy.

Figure 3:
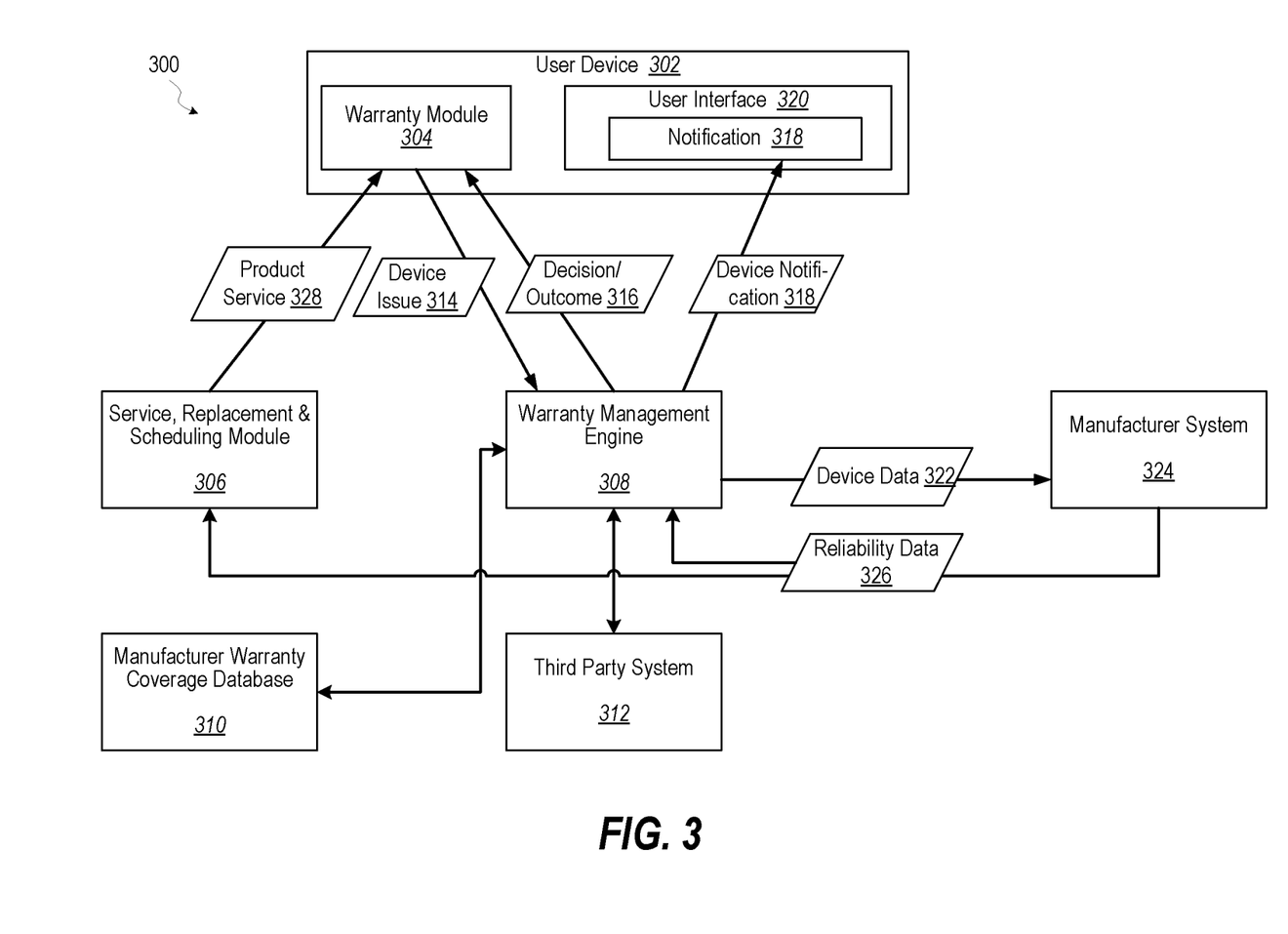
FIG. 3 illustrates a block diagram of main components of a warranty and service management system, according to one or more embodiments.

FIG. 3 illustrates that main components of a warranty and service management system 300 can comprise a user device 302, warranty module 304, service-replacement-scheduling module 306, which gather all customer product information. A warranty management engine 308 can communicate with a manufacturer's warranty coverage database 310 and a third party's system 312 to get the related credit card and insurance information. The warranty management engine 308 can collect device issue data 314 that is received from a warranty module 304 on the user device 302 or directly from an IoT device itself or an assembly that includes an IoT device. The warranty management engine 308 can return a decision or outcome message 316 of a warranty coverage decision to the warranty module 304. For benefit of the user, the warranty management engine 308 can return a device notification 318 to a user interface 320 of the user device 302. Device data 322 gleaned by the warranty management engine 308 can be shared with a manufacturer system 324 for generating reliability data 326 that be used to shape recommended service intervals, size of required inventory, etc., sent as a product service message 328 by the service, replacement and scheduling module 306.

Figure 4:
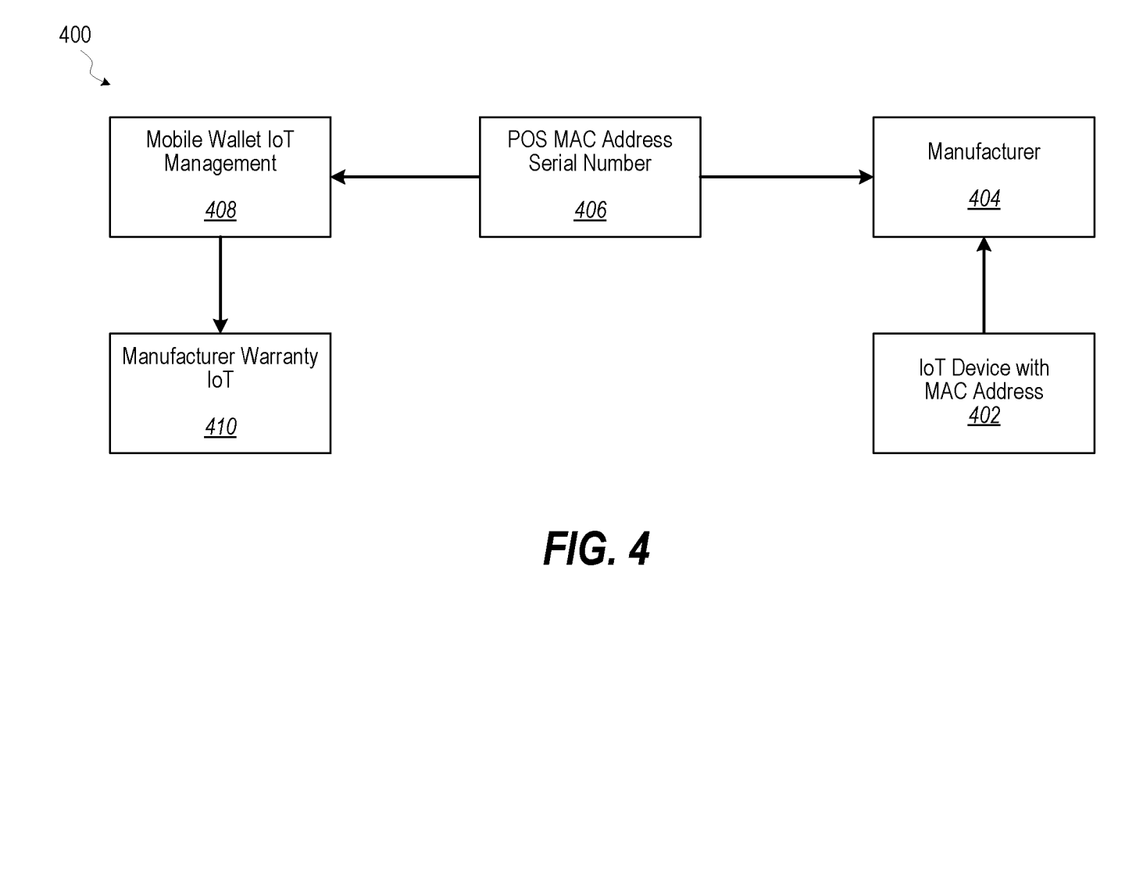
FIG. 4 illustrates a block diagram of a system for product registration with a mobile wallet based on an IoT complaint system, according to one or more embodiments.

FIG. 4 illustrates a system 400 for product registration with a mobile wallet based on an IoT complaint system. The sensors and monitors in all the IoT devices or products 402 provide a tremendous source of data to a manufacturer 404. A competitive advantage can be gained as to using that data to improve service delivery with predictive and remote activities. The capitalizing on the data by sharing the data with engineering and other parts of the organization can help with both product and service improvements. The incentive to an end user to allow sharing of the IoT device data is registering a warranty. To this end, at POS, MAC address as a serial number 406 is shared with the manufacturer 404 and a mobile wallet IoT management engine 408 to create a manufacturer warranty for an IoT device 410.

Figure 5:
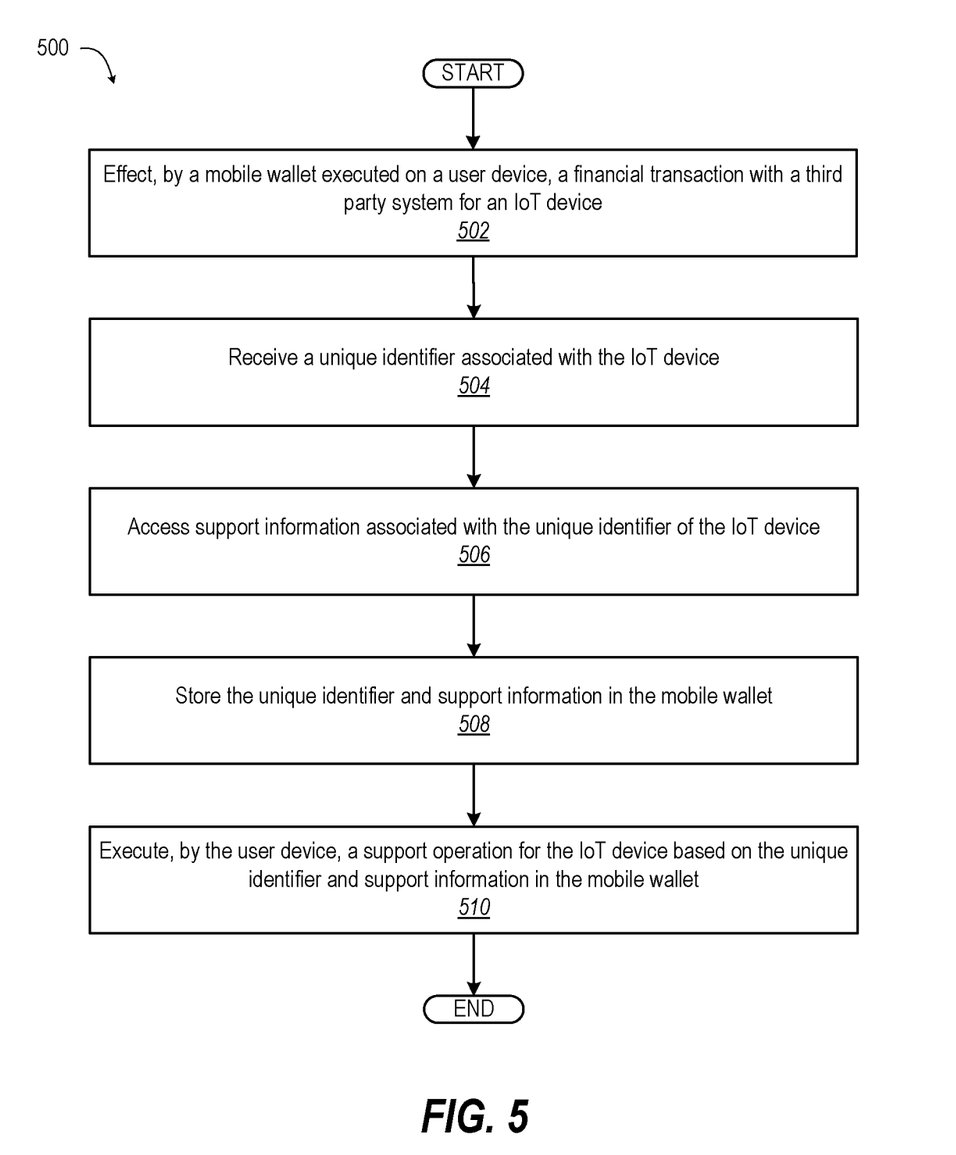
FIG. 5 illustrates a flow diagram of a method of automating support for an IoT device by a trusted agent, according to one or more embodiments.

FIG. 5 illustrates a method 500 of automating support for an IoT device by a trusted agent. In one or more embodiments, the method 500 begins effecting, by a mobile wallet executed on a user device, a financial transaction with a third party system for an IoT device (block 502). Method 500 includes receiving a unique identifier associated with the IoT device (block 504). Method 500 includes accessing support information associated with the unique identifier of the IoT device (block 506). Method 500 includes storing the unique identifier and support information in the mobile wallet (block 508). Method 500 includes executing, by the user device, a support operation for the IoT device based on the unique identifier and support information in the mobile wallet (block 510). Then method 500 ends.

In one or more embodiments, method 500 includes executing support operation by registering a selected one of: (i) a warranty agreement; and (ii) an insurance agreement offered by a guarantor to a purchaser of the IoT device. The registration is based on user information, the unique identifier, and the support information in the mobile wallet.

In one or more embodiments, method 500 includes receiving a user input indicating an ownership transfer of the IoT device; and, in response to the user input, communicating the ownership transfer to the guarantor.

In one or more embodiments, method 500 includes determining occurrence of a trigger event that indicates applicability of a restitution obligation by the guarantor of the IoT device according to terms of the selected one of: (i) the warranty agreement; and (ii) the insurance agreement; and requesting, by the user device, restitution by communicating to the guarantor one or more of: (a) user information; (b) the unique identifier, and (c) the support information in the mobile wallet.

In one or more embodiments, method 500 includes receiving an alert from one of: (i) a manufacturer of the IoT device that receives diagnostic information originating on the IoT device; (ii) a system connected to the IoT device; and (iii) the IoT device; and generating a user alert on a user interface device of the user device to take a corrective action for the IoT device.

In one or more embodiments, method 500 includes executing the support operation by registering a warranty agreement. Method 500 further includes facilitating execution of an overlapping or successor insurance agreement offered by a guarantor to a purchaser of the IoT device by using user information, the unique identifier, and the support information in the mobile wallet.

In one or more embodiments, method 500 includes communicating with a POS system by the user device to effect the financial transaction with the third party. In a particular embodiments, method 500 includes scanning the unique identifier attached to the IoT device; and requesting the support information from a remote data structure. In an exemplary embodiment, the unique identifier is a selected one of: (i) a radio frequency identifier (RFID) tag; (ii) a one-dimensional barcode; and (iii) a two-dimensional barcode.

In one or more embodiments, method 500 includes tracking by the mobile wallet of an inventory including the IoT device is one of an inventory of IoT devices. In one or more embodiments, method 500 includes communicating via a network-connected application executed by the user device to effect the financial transaction with the third party.

In one or more embodiments, the unique identifier is a medium access control (MAC) address. The method 500 includes executing the support operation comprises automatically connecting the IoT device to a network router using the MAC address.

Figure 6:
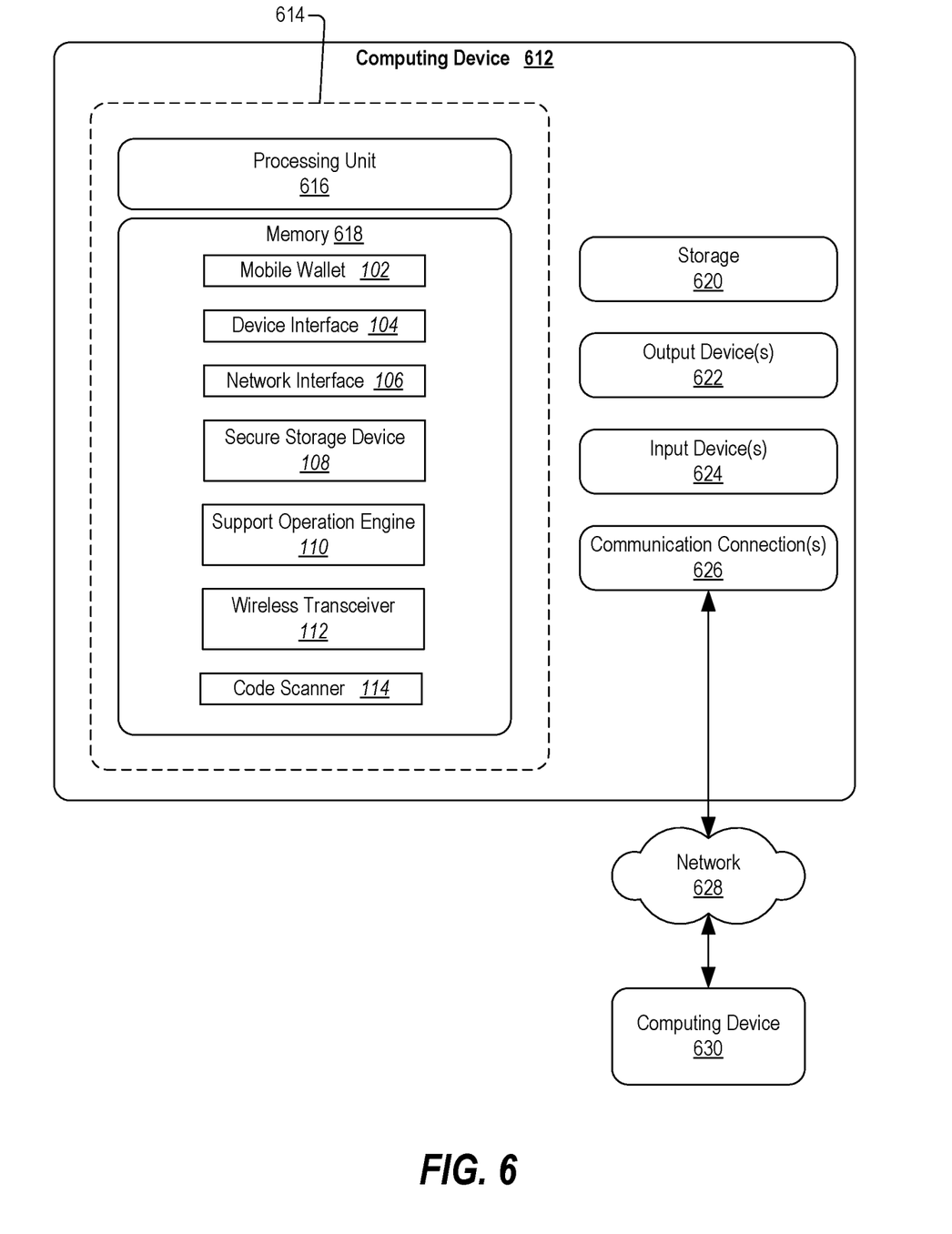
FIG. 6 illustrates a block diagram of a system having a computing device for automating support for an IoT device by a trusted agent, according to one or more embodiments.

FIG. 6 illustrates a system 600 including a computing device 612 configured to implement one or more embodiments provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other embodiments, device 612 includes additional features or functionality. For example, device 612 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more embodiments, an input device or an output device from another computing device may be used as input device(s) 624 or output device(s) 622 for computing device 612. Device 612 may include communication connection(s) 626 to facilitate communications via a network 628 with one or more other computing devices 630.

Certain functionalities of IoT device support operations can be performed by software applications resident in memory 618, such as mobile wallet 102, device interface 104, network interface 106, secure storage 108, support operation engine 110, wireless transceiver 112, and code scanner 114.

Figure 7:
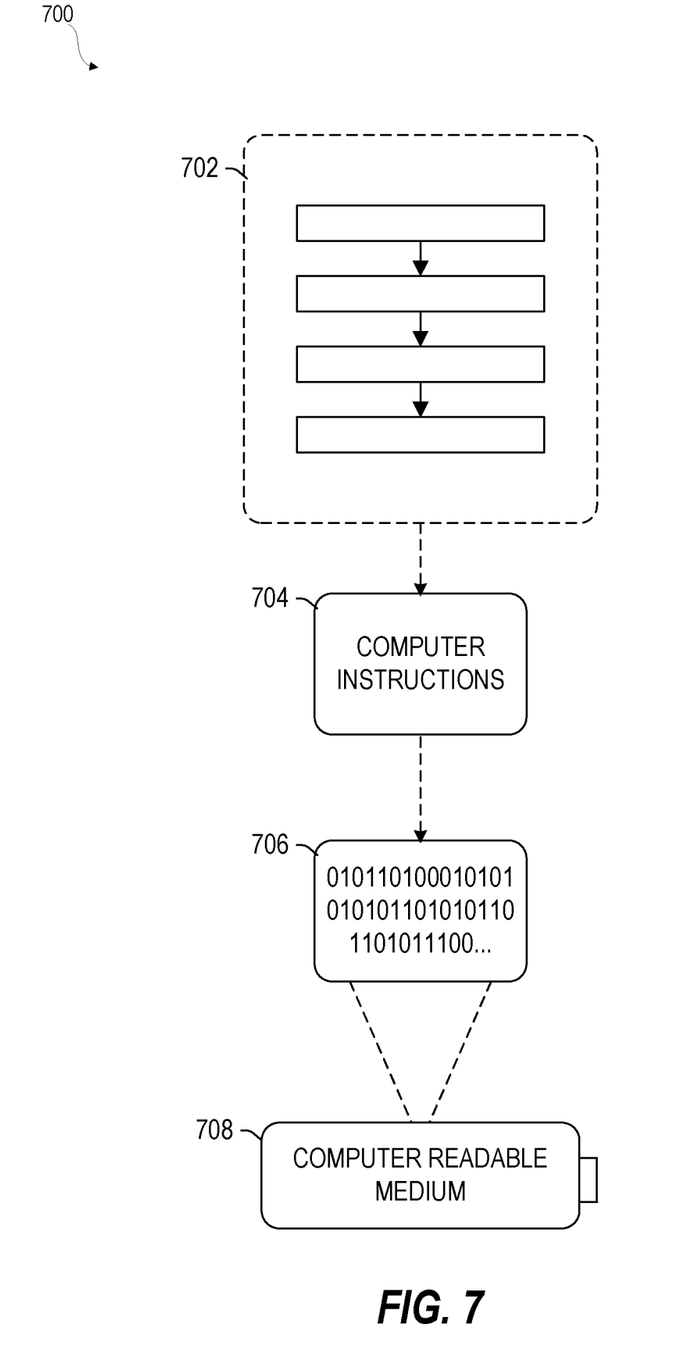
FIG. 7 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 may be configured to perform a method 702, such as method 300 of FIG. 3. In another embodiment, the processor-executable instructions 704 may be configured to implement a system, such as the system 100 of FIG. 1. Many such computer-readable media may be devised by those of ordinary skill in the art that are configured to operate in accordance with the techniques presented herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method of automating support for an Internet of Things (IoT) device by a trusted agent, the method comprising:
    effecting, by a mobile wallet executed on a user device, a financial transaction with a third party system for an IoT device, the effecting comprising:
        communicating with a point of sale (POS) system by the user device to effect the financial transaction with the third party system;
        scanning a unique identifier attached to the IoT device;
        requesting support information from a remote data structure, wherein the unique identifier is selected from at least one of: (i) a radio frequency identifier (RFID) tag; (ii) a one-dimensional barcode; and (iii) a two-dimensional barcode;
    receiving the unique identifier associated with the IoT device;
    accessing the support information associated with the unique identifier of the IoT device;
    storing the unique identifier and the support information in the mobile wallet; and executing, by the user device, a support operation for the IoT device based on the unique identifier and support information in the mobile wallet, wherein executing the support operation comprises:
        automatically connecting the IoT device to a network router using a medium access control (MAC) address, wherein the unique identifier comprises the MAC address; and
        registering a selected one of: (i) a warranty agreement; and (ii) an insurance agreement offered by a guarantor of the IoT device to a purchaser of the IoT device by using the user information, the unique identifier, and the support information in the mobile wallet;
    determining occurrence of a trigger event that indicates applicability of a restitution
    obligation by the guarantor of the IoT device according to terms of the selected one of: (i) the warranty agreement; and (ii) the insurance agreement;
    requesting, by the user device, restitution by communicating to the guarantor of the IoT device at least one of: (a) the user information; (b) the unique identifier, and (c) the support information in the mobile wallet;
    receiving an alert from one of: (i) a manufacturer of the IoT device that receives diagnostic information originating on the IoT device; (ii) a system connected to the IoT device; and (iii) the IoT device; and
    generating a user alert on a user interface device of the user device to take a corrective action for the IoT device.

2. The method of claim 1, further comprising:
    receiving a user input indicating an ownership transfer of the IoT device; and
    in response to the user input, communicating the ownership transfer to the guarantor.

3. The method of claim 1, wherein executing the support operation comprises:
    registering the warranty agreement; and
    facilitating execution of an overlapping insurance agreement or successor insurance agreement offered by the guarantor of the IoT device to the purchaser of the IoT device by using the user information, the unique identifier, and the support information in the mobile wallet.

4. The method of claim 1, further comprising tracking by the mobile wallet of an inventory including the IoT device is one of an inventory of IoT devices.

5. The method of claim 1, further comprising communicating via a network-connected application executed by the user device to effect the financial transaction with the third party system.

* * * * *